(No Model.)
G. WINDING.
MOLD FOR PAVING BLOCKS OR TILES.
No. 438,875. Patented Oct. 21, 1890.
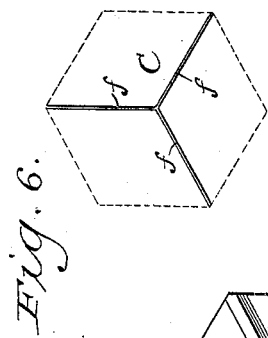
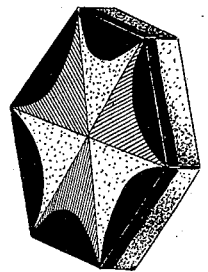
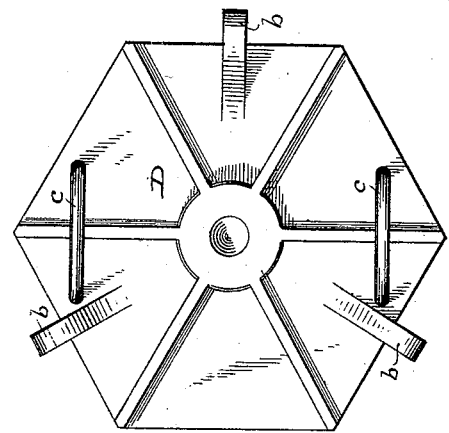
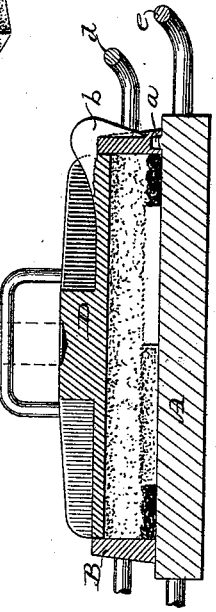
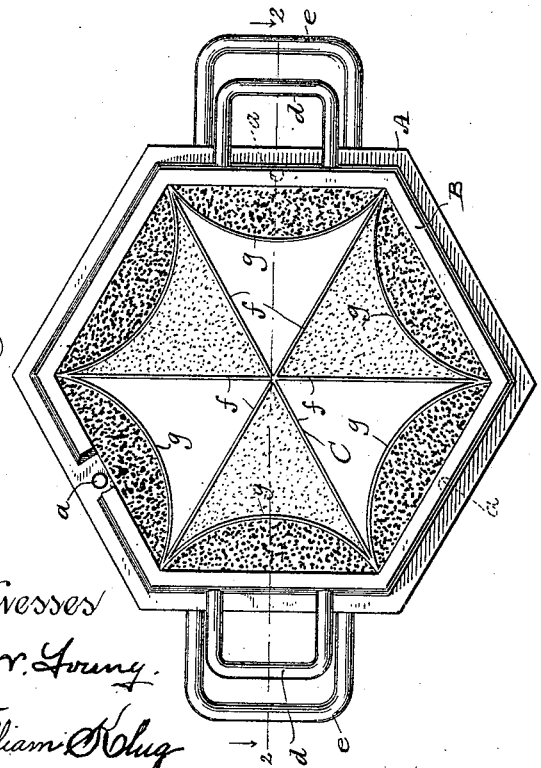
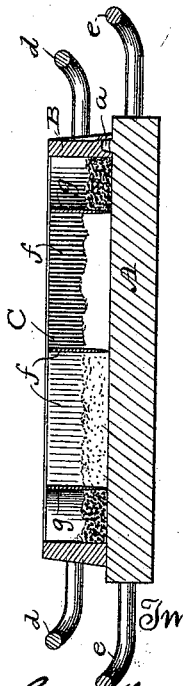
Witnesses
Geo. W. Young.
William Klug.
Inventor
George Winding
By Stout & Underwood
Attorneys
THE NORRIS PETERS CO., PHOTO-LITHO., WASHINGTON, D. C.

UNITED STATES PATENT OFFICE.

GEORGE WINDING, OF MILWAUKEE, WISCONSIN.

MOLD FOR PAVING BLOCKS OR TILES.

SPECIFICATION forming part of Letters Patent No. 438,875, dated October 21, 1890.

Application filed March 23, 1889. Serial No. 304,541. (No model.)

*To all whom it may concern:*

Be it known that I, GEORGE WINDING, of Milwaukee, in the county of Milwaukee, and in the State of Wisconsin, have invented certain new and useful Improvements in Molds for Paving Blocks and Tiles; and I do hereby declare that the following is a full, clear, and exact description thereof.

My invention relates to the manufacture of vari-colored tiles and paving-blocks, and will be fully described hereinafter.

In the drawings, Figure 1 is a mold having a set of formers therein and also containing the top layer of cement of various colors. Fig. 2 is a section on line 2 2, Fig. 1. Fig. 3 is a plan view of the cover of the mold. Fig. 4 is a sectional view of a filled mold with the cover in place. Fig. 5 is a perspective view of a block or tile finished, and Fig. 6 is a plan view of one of my formers with the outline of the drag shown in dotted lines.

A is the bed-plate of the mold.

B is the drag.

C is the former, and D is the cover.

The bed-plate is cast with dowels $a$, that fit in corresponding openings in the lower edge of the drag and prevent the drag from being turned on the bed-plate. I have shown the drag and bed-plate of six-sided contour; but they may be made with any other desired contour. The top D has the same contour that the drag has, and is designed to fit snugly in it, and is provided with guides $b$, which, when the top is in place, overhang the drag and center the top, which also has handles $c$, by which it is lifted. The drag and bed-plate also have handles $d$ and $e$, respectively.

The former C is made with any desired number of division-plates $f$ and $g$. For instance, instead of having six radial division-plates, as in Fig. 1, it may have a less number, as in Fig. 6, and the plates $g$ may be omitted or replaced by others of different shapes, according to the design of tile or block desired.

In making tiles or blocks the drag is first placed in position on the bed-plate and the former adjusted in the drag. Then cement, mortar, or other material of the desired colors is put into the compartments formed by the plates of the former, and wet sand or cement is filled in on top until the drag is heaping full. This is now slightly packed, and then the former is carefully withdrawn and the top is placed in position and subjected to a pressure which solidifies the mass, and the result is a block such as shown in Fig. 5.

Having thus fully described my invention, what I claim as new, and desire to secure by Letters Patent, is—

The combination, with a mold having dowels upon its upper side near its margin, and a drag having sockets arranged to be engaged by the dowels, of a top or cover having guides arranged to overlap the drag, and provided on its upper side with means, substantially as set forth, for receiving a plunger for compressing the material, and a former arranged to intervene between the mold and cover, for the purposes set forth.

In testimony that I claim the foregoing I have hereunto set my hand, at Milwaukee, in the county of Milwaukee and State of Wisconsin, in the presence of two witnesses.

GEORGE WINDING.

Witnesses:
S. S. STOUT,
WM. ABEL.